United States Patent
Sista et al.

(10) Patent No.: US 9,069,937 B2
(45) Date of Patent: Jun. 30, 2015

(54) CONVERTING TRADITIONAL COMPUTER PRODUCT LICENSES INTO CLOUD-BASED ENTITLEMENTS

(71) Applicant: CISCO TECHNOLOGY, INC., San Jose, CA (US)

(72) Inventors: Satish Sista, San Jose, CA (US); Nishanth Nair, San Jose, CA (US)

(73) Assignee: Cisco Techology, Inc., San Jose, CA (US)

( * ) Notice: Subject to any disclaimer, the term of this patent is extended or adjusted under 35 U.S.C. 154(b) by 30 days.

(21) Appl. No.: 13/924,586

(22) Filed: Jun. 23, 2013

(65) Prior Publication Data

US 2014/0380490 A1    Dec. 25, 2014

(51) Int. Cl.
*G06F 17/30* (2006.01)
*G06F 21/10* (2013.01)

(52) U.S. Cl.
CPC ................................... *G06F 21/105* (2013.01)

(58) Field of Classification Search
CPC ........ G06F 21/10; G06F 21/105; G06F 21/12
USPC ......... 726/26–30; 713/167, 189, 191; 705/51, 705/56–59
See application file for complete search history.

(56) References Cited

U.S. PATENT DOCUMENTS

| 6,169,976 | B1 * | 1/2001 | Colosso ........................ 705/59 |
| 6,189,146 | B1 * | 2/2001 | Misra et al. .................. 717/177 |
| 7,359,883 | B2 * | 4/2008 | Namba et al. .................. 705/59 |
| 8,091,142 | B2 * | 1/2012 | Liu et al. ........................ 726/30 |
| 2011/0302623 | A1 * | 12/2011 | Ricci .............................. 726/1 |

* cited by examiner

*Primary Examiner* — Hosuk Song
(74) *Attorney, Agent, or Firm* — Patterson & Sheridan LLP

(57) ABSTRACT

Techniques are provided for converting a node-locked licensing scheme to a cloud-based management of licenses to use computer products. In one example, a license manager device of a vendor receives a request to upgrade a computer product that is associated with a node-locked certificate that configures the computer product to be node-locked to a particular device. The request includes an identifier of the computer product. The license manager device registers the product identifier to a license pool of a customer account associated with the computer product. The license pool includes entitlements to use the computer product. The license manager device searches for node-locked entitlements that are associated with the node-locked certificate. The license manager device moves the node-locked entitlements to the license pool.

17 Claims, 7 Drawing Sheets

CONVERTING TRADITIONAL COMPUTER PRODUCT LICENSES INTO CLOUD-BASED ENTITLEMENTS

TECHNICAL FIELD

Embodiments presented in this disclosure generally relate to software licensing and, more particularly, to techniques for converting traditional computer product licenses into cloud-based licenses.

BACKGROUND

Licenses for computer software and hardware are typically provided to end-user customers via a product activation key (PAK). A PAK is a code that a customer uses to enable, activate, or access features on computer products. The customer associates a PAK with a specific software product (or hardware device) by entering the PAK into a portal, which returns a cryptographic license key. When associated with a specific device, the license key unlocks features on the specific device or allows a software installation process to be completed. Accordingly, through a three-step process (from PAK, to license key, and to device configuration), the customer proves product ownership directly for every single software application installed on a hardware device as well as for each hardware device itself. For example, a user may activate a network router by entering a license key into an interface on the network router. In response, the router passes information to the vendor, which validates the PAK and provides any license or use keys. In turn, the license key (or other information) is node-locked on the network router. Similarly, software may be activated by entering a PAK in an interface presented by an install tool. This licensing approach delegates decisions to enforce the software license into the hardware device (e.g., switch, router, etc.) or software application.

Such an approach is problematic where a vendor uses a channel partner (e.g., reseller) to distribute products to an end customer. The channel partner receives each PAK from the vendor and passes the PAK to a customer. When the PAK is sent to the vendor, the vendor typically does not know the identity of the customer. While the customer may include an identity when registering a hardware/software product, the customer may do so independently for each software product or hardware device.

The disconnect that results from independently registering/activating each hardware device or software installation results in a lack of an inventory of what licenses are owned (or used), for both the vendor and the customer. That is, the vendor and the end customer are often unaware of exactly what licenses a given customer has acquired. Further, this approach limits the ability of a customer to change how license rights are used, as license keys are typically node locked to a single device installation or hardware device. For example, assume a customer (e.g., a university) purchases from a reseller (e.g., a network equipment reseller) licenses for software. Assume, for example, that the software configures a local area network (LAN) to provide firewall services and that the customer acquires licenses for twelve routers. The customer receives license PAKs for the software for use on the twelve routers. Sometime later, the customer decides to purchase database services from the reseller, while downgrading the firewall services and implementing the software on only ten routers, instead of twelve routers. The licensing scheme does not provide a mechanism for the customer for such a change in license use or allocation across their devices.

Unfortunately, even with the best intentions, tracking licenses becomes convoluted. In short order, neither the vendor nor the end customer knows exactly what products and services the end customer owns and is using. These issues are complicated when both the vendor and the customer redeem license keys using PAKs. Neither the vendor, nor the channel partner, nor the customer has a complete ownership history. If the licenses are lost (e.g., through fire or theft), it would be hard to recover the licenses as there is no single point of truth in the system.

Further, to address compliance issues, the vendor may administer an auditing process after the fact to determine whether the customer is in compliance with their acquired license rights. However, doing so is complex, is expensive, and can cause poor customer relations.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Figure 1:
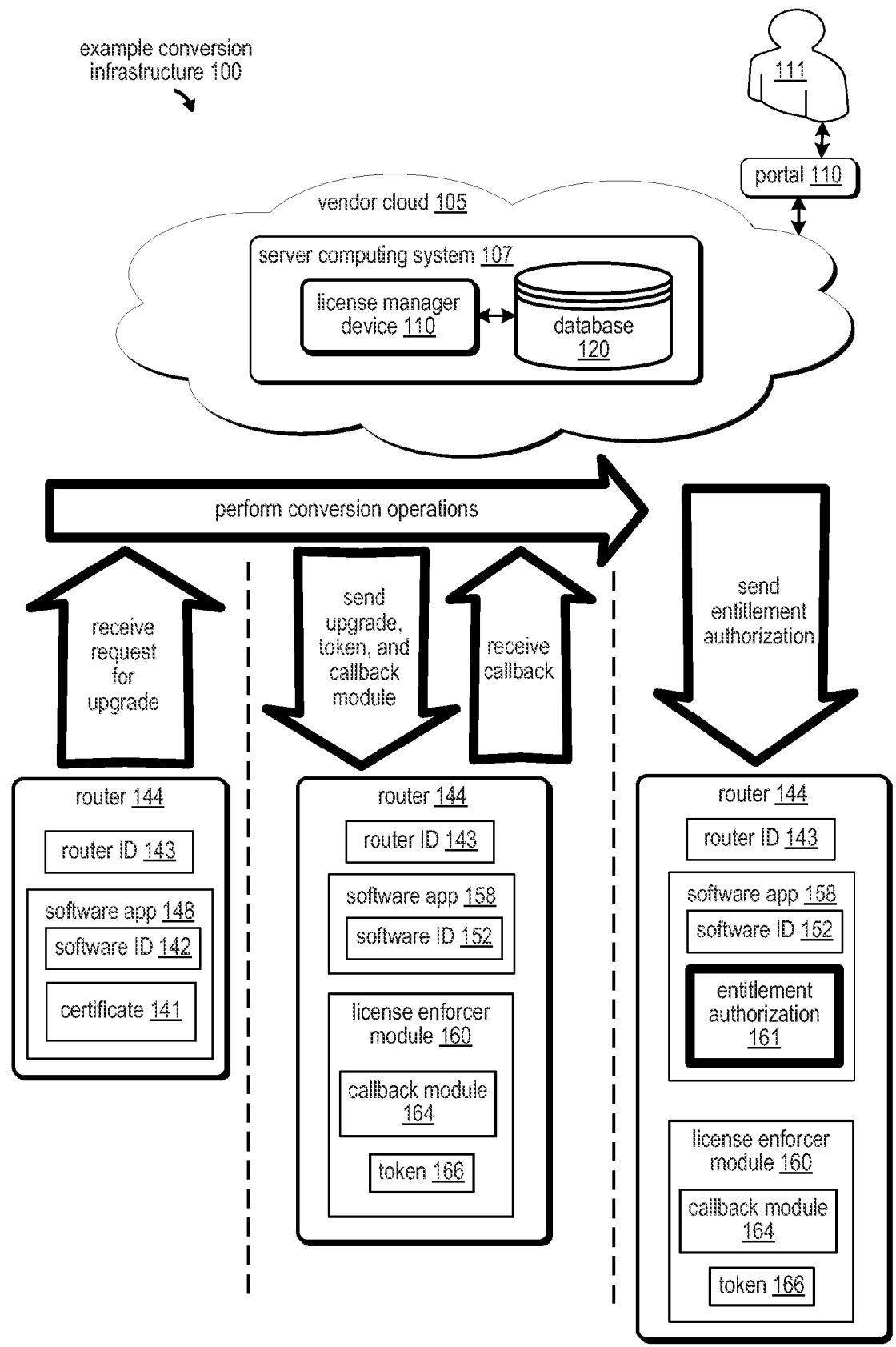
FIG. 1 is a conceptual diagram of an example conversion infrastructure, according to one embodiment.

Embodiments presented herein include a method, computer program product and system that provide cloud-based auditing and management of licenses to use computer products. Such a method may include receiving, by a license manager, a request to upgrade a computer product associated with entitlements stored on a particular device along with the computer product. The request includes an identifier for the computer product. This method may further include registering the product identifier with a customer account, identifying the entitlements associated stored on the particular device, and associating the entitlements with a pool of one or more entitlements associated with the customer account. In a particular embodiment, this method may further include generating an entitlement authorization associated with the license pool and sending the entitlement authorization to the particular device.

DESCRIPTION OF EXAMPLE EMBODIMENTS

Embodiments presented herein provide an approach for converting a node-locked licensing scheme to a cloud-based, or more specifically, a vendor controlled, scheme for managing licenses or entitlements to use computer products. When a customer purchases computer products from a vendor, a license manager device of the vendor generates a customer account associated with the purchases. The customer acquires entitlements that a linked to a node-locked certificate (e.g., PAK). The node-locked certificate effectively node-locks each computer product (e.g., each software application) to a particular device (e.g., router). That is, the computer product is installed and activated on a particular device (i.e., a "node") by using a node-locked certificate. The node-locked certificate links entitlements for the computer product directly to the particular device at a local level. Instead, using the techniques disclosed herein, the vendor holds and manages entitlements in the vendor cloud.

In one embodiment, node-locked licenses, or entitlements, may be de-associated with the individual device or software installation and migrated to a cloud-based pool associated with a customer. For example, the license manager device may receive a request to upgrade a computer product associated with a node-locked entitlement (i.e., node-locked license right) associated with a particular device. The request identifies the computer product. The license manager device registers the product identifier with a license pool of a customer account associated with the computer product. The license pool includes entitlements acquired by that customer for any number of computer hardware devices or software installations. The license manager device searches a vendor database for existing node-locked entitlements that are associated with the node-locked certificate. The license manager device adds the node-locked entitlements to the license pool.

Once the entitlements are in the pool, computer products relying on that pool may request an authorization decision (e.g., based on a configured set of licensed features for that computer product). In response, the license manager device generates an entitlement authorization associated with the license pool and sends the entitlement authorization to the particular device. The entitlement authorization may include a cryptographic message signed by the license manager device. Such a message may indicate that the entitlements (now managed by the license manager device in the vendor cloud) are available to the particular device for a validity period (e.g., ninety days). More generally, the authorization decision may indicate that the computer product is being used "in compliance" with the entitlements available in the pool (and with the customer's use of other computer products relying on that pool for usage entitlements. Such a decision may remain valid for period specified in the decision (e.g., a period of 90 days). At the same time, a renewal period may be much shorter, e.g., (a period of 30 days). In such a case, the computer product may begin attempting to renew the authorization decision with a substantial amount of time remaining in the current authorization. Doing so may allow a response of "non-compliance" to be addressed prior to the expiration of the current validity period.

Advantageously, the license manager device can convert entitlements that are node-locked to a computer product to a license pool that are manageable via the vendor cloud. Also, the license manager device can register additional computer products in the same license pool as the converted computer product. The license manager device can then audit and manage the computer products via a vendor cloud. The license manager device can send licenses information to a vendor management console and/or customer management console. The vendor and/or the customer can view the information on demand on the respective consoles. The license manager device provides an accurate profile of registered computer products, entitlements, configuration states, and authorization decisions associated with the customer account.

FIG. 1 is a conceptual diagram of an example conversion infrastructure 100, according to one embodiment. The conversion infrastructure 100 converts a node-locked computer product into a computer product that is associated with licenses and entitlements that are manageable via a vendor cloud 105. The vendor cloud 105 includes a server computing system 107, which includes a license manager device 110 connected to a database 120. In some embodiments, the vendor cloud 105 can deliver license management services (via servers, storage, and applications) to vendor computers and customer 111 computers.

Before conversion, a license to use the software application 148 is node-locked on the router 144 by a certificate 141 for the software application 148. The certificate 141 includes, for example, a product activation key (PAK) that ties the software application 148 specifically to the router 144. The server computing system 107 may maintain a customer account and any entitlements that may be associated with the installation of the certificate 141. Such a licensing scheme is problematic when, for example, the customer 111 attempts to upgrade or downgrade services or to determine compliance across multiple devices. The licensing scheme with the certificate 141 does not provide a mechanism for the vendor to maintain accurate auditing of entitlements or licenses acquired by the customer 111. The present techniques convert the node-locked software application 148 into a software application 158 that is associated with entitlements managed via the vendor cloud 105.

In one embodiment, the customer 111 uses the portal 110 to initiate upgrade operations for the router 144. Specifically, the license manager device 110 receives a request to upgrade the software application 148 on the router 144. The upgrade request includes a software identifier 142, a router identifier 143, and the certificate 141 (e.g., PAK).

In response to receiving the upgrade request, the license manager device 110 manager initiates conversion operations. The license manager device 110 checks if a customer account exists for the node-locked certificate 141. If a customer account does not exist, the license manager device 110 generates a customer account with a default license pool, including entitlements, terms, and conditions that apply to the software application 148, the router 144, or family of computer products. For example, a license pool may entitle a customer to operate a particular version of router software on ten routers with five ports open. The license manager device 110 registers the software identifier 142 and the router identifier 143 in the license pool for the customer account.

The license manager device 110 sends a token 166, a callback module 164, and an upgraded software application 158 having a software identifier 152. In this example, the license manager device 110 includes the callback module 164 and the token 166 in a license enforcer module 160, further described below. The token 166 includes a cryptographic key that associates the software identifier 152 and the router identifier 143 with the license pool generated by the license manager device 110. The callback module 164 includes instructions for the router 144 to call the server computing system 107 to register the installation of the upgraded software application 158. The router 144 installs the token 166, the callback module 164, and the upgraded software application 158. The router 144 reboots with the upgraded software application 158, the token 166, and the call back instructions 164 to complete installation.

The license manager device 110 receives a callback from the router 144 to register the software application 158. The callback includes the software identifier 152, the router identifier 143, and the token 166. The license manager device 110 continues conversion operations by using the software identifier 152, the router identifier 143, and/or the token 166, to query the database 120 for existing node-locked entitlements that may be associated with the certificate 141. If node-locked entitlements exist, the license manager device 110 moves the node-locked entitlements to the license pool that is setup for the upgraded software application 158 on the router 144. Alternatively, the software application or hardware device being upgraded may report what entitlements have been activated or otherwise installed for that application or on that device.

Once converted into entitlements stored in a pool on the vendor cloud 105, the license manager device 110 generates entitlement authorizations associated with the license pool. The entitlement authorization 161 includes a cryptographic key that authorizes the router 144 to use the software application 158 according to entitlements in the license pool managed by license manager device 110. More simply, an entitlement authorization may indicate that a router 144 and/or application 158 are "in compliance" based on the entitlements in the customer account pool. The license manager device 110 sends the entitlement authorization to the router 144. Once received, the router 144 can operate according to the entitlement authorization, e.g. indicating the device is being used "in compliance" for at least a validity period associated with the entitlement authorization.

In another embodiment, the customer 111 can register a computer product that does not have an existing node-locked certificate (e.g., PAK). At the time of purchase, the customer is provided with a token that includes a cryptographic key that associates, for example, a software identifier with a license pool managed by the license manager device 110. Using the portal 110, the customer 111 registers the computer product with the license manager device 110 by sending token and the product identifier to the license manager device 110. The license manager device 110 searches for the customer account associated with the token and/or the product identifier. The license manager device 110 registers the product identifier in an appropriate license pool of the customer account. The license pool may be the same license pool as the pool used by the router 144 described above. That is, both computer products may rely on entitlements from a common license pool. The license manager device 110 then generates an entitlement authorization associated with the product identifier and sends the entitlement authorization to the computer product.

Advantageously, the license manager device 110 can convert entitlements or license rights that have been node locked on a computer product to entitlements managed via the vendor cloud 105. Also, the license manager device 110 can register a computer product that is not previously node-locked in the same license pool as the converted computer product. The license manager device 110 can then audit and manage entitlements consumed by the computer products, as described below.

Figure 2:
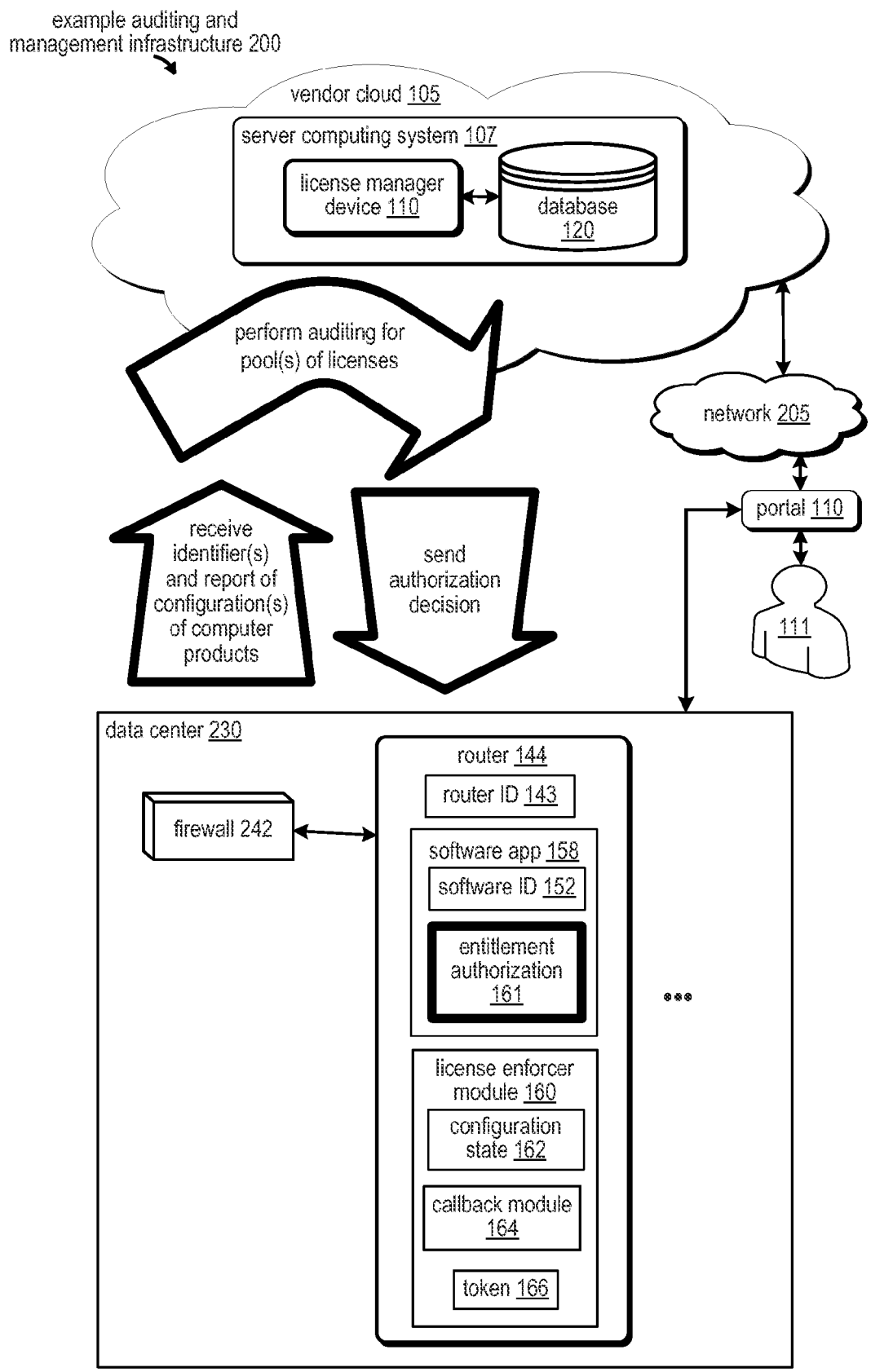
FIG. 2 illustrates an example auditing and management infrastructure, according to one embodiment.

FIG. 2 is a conceptual diagram of an example auditing infrastructure 200, according to one embodiment. A network 205 (e.g., the Internet) connects the vendor cloud 105 and a data center 230. For explanatory purposes, the data center 230 illustrates the computer environment of the customer. In this example, the customer 111 communicates with a portal 110, which is connected to the data center 230 and the network 205. As shown in FIG. 2, the data center 230 includes computer products purchased by the customer that are connected to the customer's network infrastructure. In this example, the data center 230 includes a firewall 142 connected to the router 144 and a router 244. The router 144 is connected to the switch 148, which is connected to the host 152 (e.g., server). In this example, the software application 149 resides on the router 144 and the software application 249 resides on the router 244.

In some embodiments, the license manager device 110 receives information from each purchased computer product deployed within the data center 230. That is, the license manager device 110 can receive a product identifier and information specifying the licensed features (e.g., configuration state) enabled on each computer product. As an example, the customer may configure router 144, 244, to have five ports open and run a specific version of router software. In one embodiment, a cryptographic identifier identifies each router (or other computer product). Periodically, a license enforcer (e.g., license enforcer 330 of FIG. 3) reports the licensed features of the respective computer product to the license manager 110.

In some embodiments, the identification of the licensed features is received in a form of a request to use features that may be subject to an entitlement. In some embodiments, a response to the request is not needed in real time. That is, a computer product may continue to use the configured features before the license enforcer receives an authorization decision from the license manager device 110.

Once the license manager device 110 receives the product identifier and the identification of the licensed features, the license manager device 110 identifies a customer account linked to the product identifier in the database 120. The license manager device 110 compares the licensed features used by that computer product with a pool of entitlements associated with the customer account. For example, the pool of license entitlements may authorize the customer to use ten routers with five open ports per router. The report of the licensed features may include four open ports for the particular router. Meanwhile, the license manager device 110 may receive, for example, reports from other routers in the customer data center 230. The license manager device 110 stores the reports and the comparison results in the database 120.

Note, while the example referenced above uses a single entitlements pool, a customer account may include multiple license pools. For example, the customer could add entitlements to operate ten routers with four ports open per router to one pool. The customer could also add entitlements to operate five routers with three ports open per router to a second pool. In some embodiments, the license manager device 110 can move entitlements from one license pool to another. For example, the license manager device 110 may move entitlements for three routers from the second license pool to the first license pool.

The license manager device 110 aggregates the comparison results. Based on the aggregation, the license manager device 110 can generate an authorization decision for each computer product (e.g., each of the ten routers). For example, if each of the ten routers is configured with four open ports and the entitlements authorize ten routers with five open ports each, then the license manager device 110 can generate an authorization result of "in-compliance" for each of the ten routers. In contrast, if each of the ten routers is configured with six open ports and the entitlements authorize ten routers with five open ports each, then the license manager device 110 can generate an authorization decision of "out-of-compliance" for each of the ten routers. The license manager device 110 then sends the authorization decision to the license enforcer module of each computer product.

In sum, the auditing operations of the license manager device 110 include, without limitation, looking up a customer account based on product identifier, comparing configuration reports with a pool of licenses, storing comparison results, aggregating the comparison results, generating authorization decisions based on the aggregation of comparison results, sending an authorization decision to each license enforcer, and updating the pool of licenses as necessary.

The license enforcer module of each computer product receives an authorization decision, including the compliance status (e.g., "in compliance" or "out of compliance"). In some embodiments, the authorization decision includes instructions to be carried out by the license enforcer module. For example, an authorization decision may include instructions for disabling use of the software application 158 due to the license manager device 110 determining the software application 158 is out of compliance. The license enforcer module 160 enforces the authorization decision by carrying out the instructions of the authorization decision.

Advantageously, the license manager device 110 can send information stored in the database 120 to a vendor management console or the customer portal 110. The vendor and customer can view the information on demand and obtain an accurate profile of registered computer products, entitlements, configuration states, and/or authorization decisions that are associated with the customer account. Accordingly, by using the auditing and management infrastructure of FIG. 2, the license manager device 110 can manage entitlements for computer products that may have been previously node-locked as described above with reference to FIG. 1.

Figure 3:
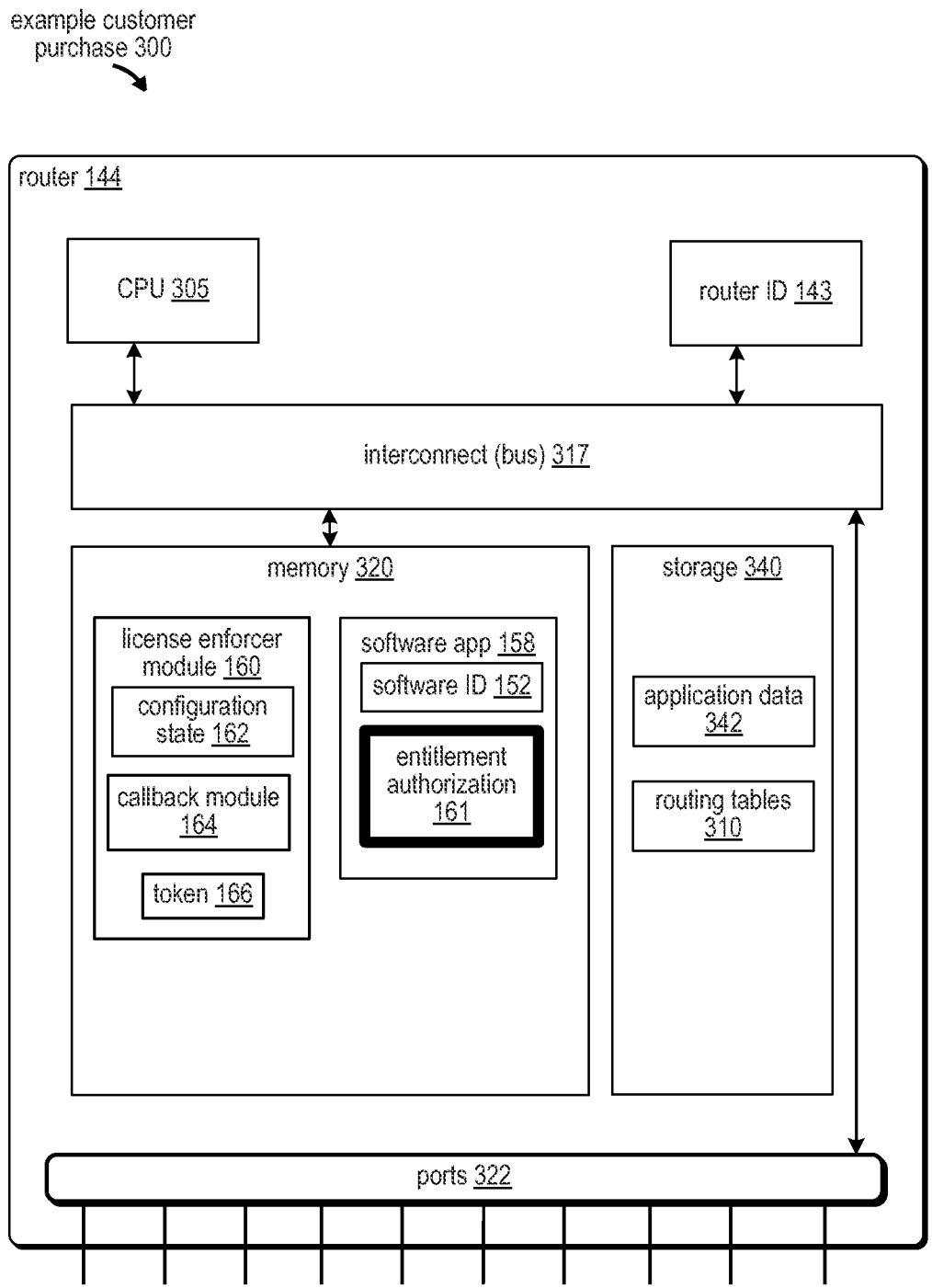
FIG. 3 illustrates an example customer purchase, according to one embodiment.

FIG. 3 is a diagram of an example customer purchase 300, according to one embodiment. For explanatory purposes, the customer purchase 300 includes a router 144. In context of this description, the computing elements shown in the router 144 correspond to hardware components and software modules (e.g., hardware and software in the data center 205 of FIG. 2).

As shown, the router 144 includes, a central processing unit (CPU) 305, router identifier 143, a memory 320, storage 340, and ports 322, each connected to a bus 317. The CPU 305 retrieves and executes programming instructions stored in the memory 320, as well as stores and retrieves application data 342 and routing tables 310 residing in the storage 340. Via the bus 317, the router 144 transmits programming instructions and application data 342 between the CPU 305, the router identifier 143, the storage 340, the memory 320, and the ports 322. Note that the CPU 305 is included to be representative of a single CPU, multiple CPUs, a single CPU having multiple processing cores, and/or the like. The memory 320 is included to be generally representative of a random access memory. The storage 340 may be a disk drive storage device. Although shown as a single unit, the storage 340 may be a combination of fixed and/or removable storage devices, such as fixed disc drives, removable memory cards, or optical storage, network attached storage (NAS), or a storage area-network (SAN).

As shown, the license enforcer device 330 in memory 320 includes software application 158 and a license enforcer module 160, which are accessible over a network connected to a port 322. The license enforcer module 162 a configuration state 162, callback module 164, and a token 166. The callback module 164 configures the router 144 to call the license manager device 110 as discussed with reference to FIGS. 1, 6, and 7. The callback module 164 is configured to send the router identifier 143, the software identifier 152, the configuration state 162, the entitlement authorization 161, and the token 166 to a license manager device of the vendor. The router identifier 143 is shown as a hardware component (e.g., hardware chip containing cryptographic data) connected to the bus 317. Alternatively, the router identifier 143 may include cryptographic data stored in the storage 340 or on the memory 320.

Advantageously, by using the entitlement authorization 161, the license manager device 110 can manage entitlements for the router 144, which may have been previously node-locked as described above with reference to FIG. 1.

Figure 4:
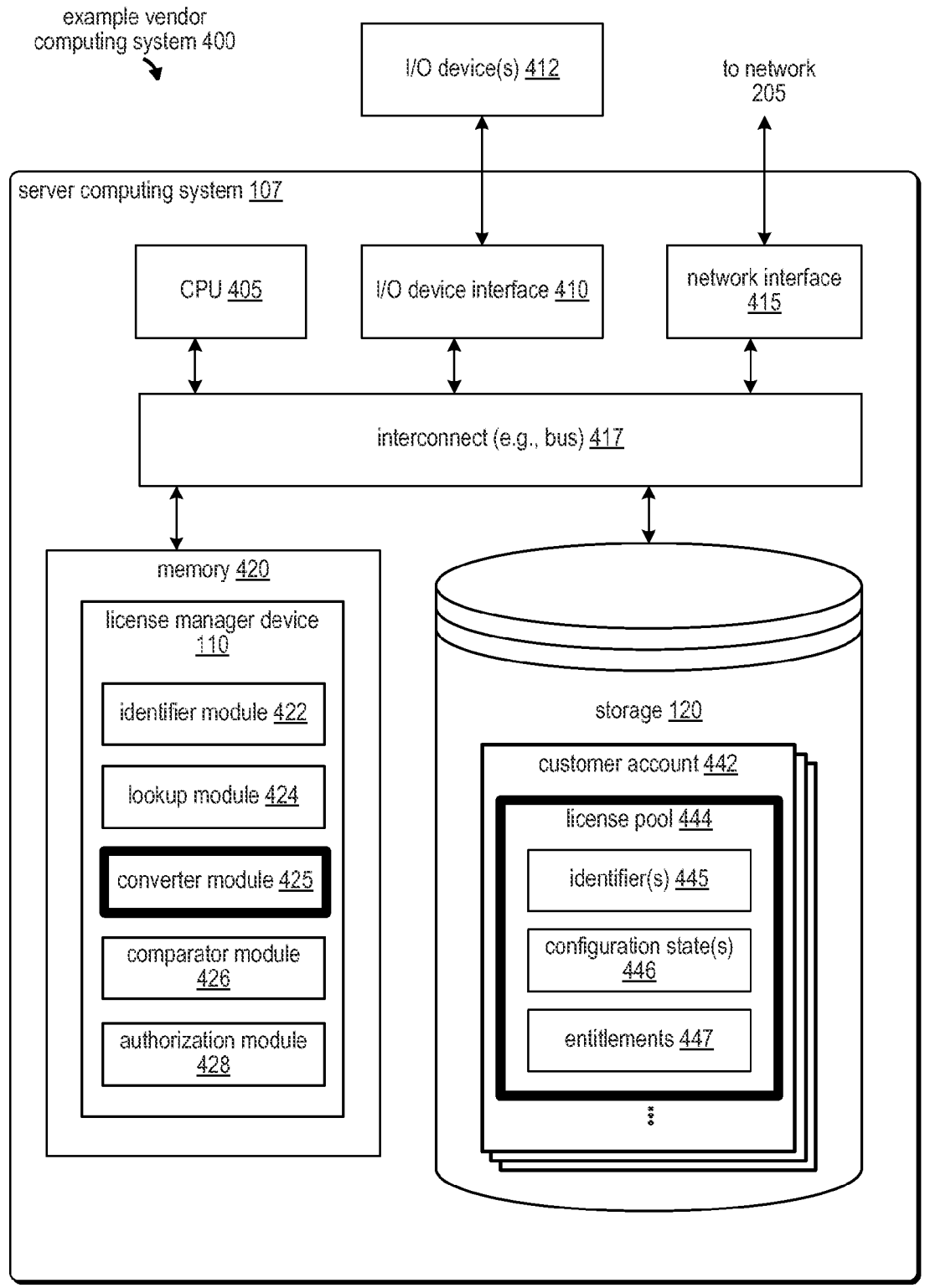
FIG. 4 illustrates example vendor computing system, which is configured to audit and manage licenses for using computer products, according to one embodiment.

FIG. 4 illustrates an example vendor computing system 400 configured to audit and manage licenses for computer products, according to one embodiment.

As shown in FIG. 4, the vendor computing system 400 includes, without limitation, a central processing unit (CPU) 405, an I/O device interface 410, a network interface 415, a memory 420, and storage 120, each connected to a bus 417. The I/O device interface 410 connects I/O devices 412 (e.g., keyboard, display, and mouse devices) to the vendor computing system 400. Further, in context of this description, the computing elements shown in vendor computing system 400 may correspond to a physical computing system (e.g., a system in a data center) or may be a virtual computing instance executing within the vendor cloud 105 of FIGS. 1 and 2.

The CPU 405 retrieves and executes programming instructions stored in the memory 420, as well as stores and retrieves application data residing in the storage 120. Via the bus 517, the server computing system 107 transmits programming instructions and application data between the CPU 405, the I/O devices interface 410, the storage 120, the network interface 415, and the memory 420. Note that CPU 405 is included to be representative of a single CPU, multiple CPUs, a single CPU having multiple processing cores, and/or the like. The memory 420 is included to be generally representative of a random access memory. The storage 430 may be a disk drive storage device. Although shown as a single unit, the storage 430 may be a combination of fixed and/or removable storage devices, such as fixed disc drives, removable memory cards, or optical storage, network attached storage (NAS), or a storage area-network (SAN).

A license manager device 110 resides on the memory 420 and includes an identifier module 422, a lookup module 424, a converter module 425, a comparator module 426, an authorization module 428, and an update module 430. The identifier module 422 is configured to receive a product identifier and a configuration state from a license enforcer of a computer product. Based on the product identifier, the lookup module 424 is configured to lookup a customer account 442 based on the product identifier. The converter module 425 is configured to perform conversion operations, as described with reference to FIGS. 1 and 6. The comparator module 426 is configured to compare information in the customer account 442 with the configuration state received from the computer product. The comparator module 426 stores the configuration state and the comparison result in the customer account 442. The comparator module 426 also stores configuration states received from other computer products in the data center 230 and stores the corresponding comparison results. The authorization module 428 aggregates the comparison results and generates authorization decisions for the computer products associated with the license pool 444 of the customer account 442. The update module 430 is configured to update, as necessary, the pool of licenses.

Accordingly, the storage 120 includes customer accounts, such as customer account 442. Each customer account includes one or more license pools, such as license pool 444. In turn, each license pool includes one or more identifiers 445 of computer products, the licensed features 446 of the computer products, and the entitlements for using the computer products 447.

Figure 5:
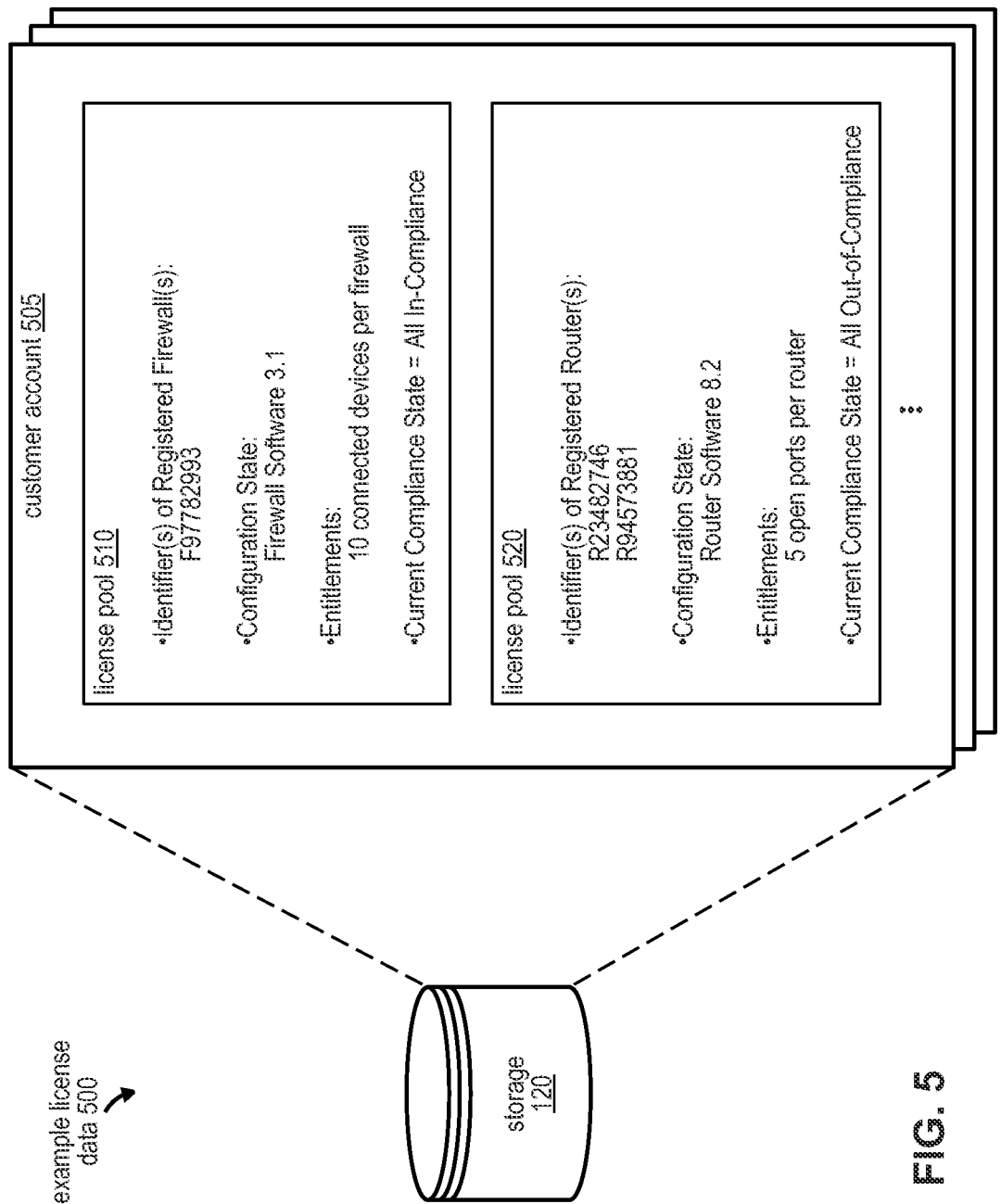
FIG. 5 illustrates example license data, according to one embodiment.

FIG. 5 illustrates an example license data 500 in the storage 120, according to one embodiment. In this example, the license data 500 includes multiple customer accounts, including a customer account 505. The customer account 505 includes multiple license pools, including a license pool 510 and a license pool 520.

The license pool 510 includes an identifier (F97782993) of a registered firewall. The configuration state of the registered firewall indicates the registered firewall is configured to run Firewall Software 3.1. The entitlements indicate the registered firewall is authorized to have ten connected devices. The current compliance state indicates the registered firewall is in-compliance.

The license pool 520 includes identifiers (R23482746 and R94573881) of register routers. The current configuration state of the registered routers indicates the routers are configured with Router Software 8.2. The entitlements indicate the registered routers are authorized to have five open ports per router. The current compliance state indicates the registered routers are out-of-compliance.

Figure 6:
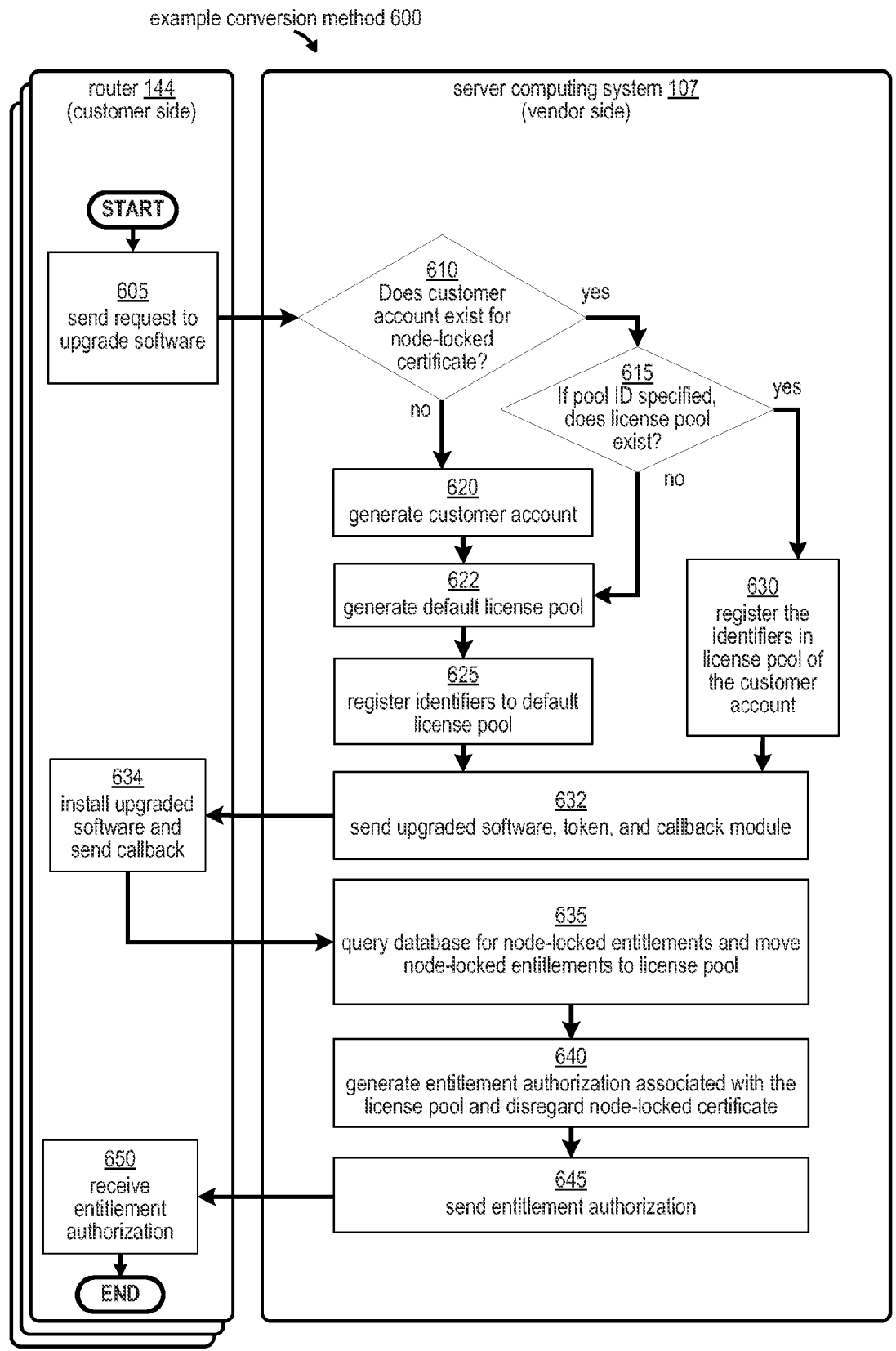
FIG. 6 illustrates an example method for the server computing system to convert node-locked software on the router to software that is manageable by the server computing system, according to one embodiment.

FIG. 6 illustrates a method 600 for the server computing system 107 to convert node-locked software on the router 144 to software that is manageable by the server computing system 107, according to one embodiment. The method 600 is part of conversions operations, which are discussed above with reference to FIG. 1.

At step 605, the router 144 sends a request to upgrade a software application on the router 144. For example, the customer may desire to upgraded to a new version of a software application that happens to be node-locked on the on the router 144. The server computing system 107 receives the request.

At step 605, the server computing system 107 determines if a customer account exists for the node-locked certificate. If a customer account does not exist, at step 620, the server computing system 107 generates a customer account. However, in some embodiments, the customer account is setup at the time of purchase, as described above with reference to FIG. 1. If a customer account does exist, in decision operation 615, the server computing system 107 determines if a license pool exists for a pool identifier that may be specified. If there is no existing license pool, at step 622, the server computing system 107 generates a default license pool. In step 625, the server computing system 107 registers the software identifier and the router identifier to the default license pool. However, if a license pool does exist, at step 630, the server computing system 107 registers the software identifier and the router identifier in the existing license pool of the customer account.

At step 632, the server computing system 107 sends an upgraded software application, a token, and a callback module to the router 144. The token includes, for example, a cryptographic key that associates the software identifier and the router identifier with the license pool that the license manager device 110 set up. The router 144 receives the upgraded software application, the token, and the callback module. At step 634, the router 144 installs the upgraded software and sends a call back to the server computing system 107 to register the installation of the upgraded software. The server computing system 107 receives the call from the router 144.

At step 635, the server computing system 107 queries a database for node-locked entitlements that may be associated with the certificate (e.g., PAK). The server computing system 107 moves the node-locked entitlements to the license pool that is set up for the customer account. Following step 640, the computer product is configured to rely on the license pool to determine compliance with license entitlements. At step 645, the server computing system 107 sends the entitlement authorization to the router 144. At step 650, the router 144 receives the entitlement authorization.

Figure 7:
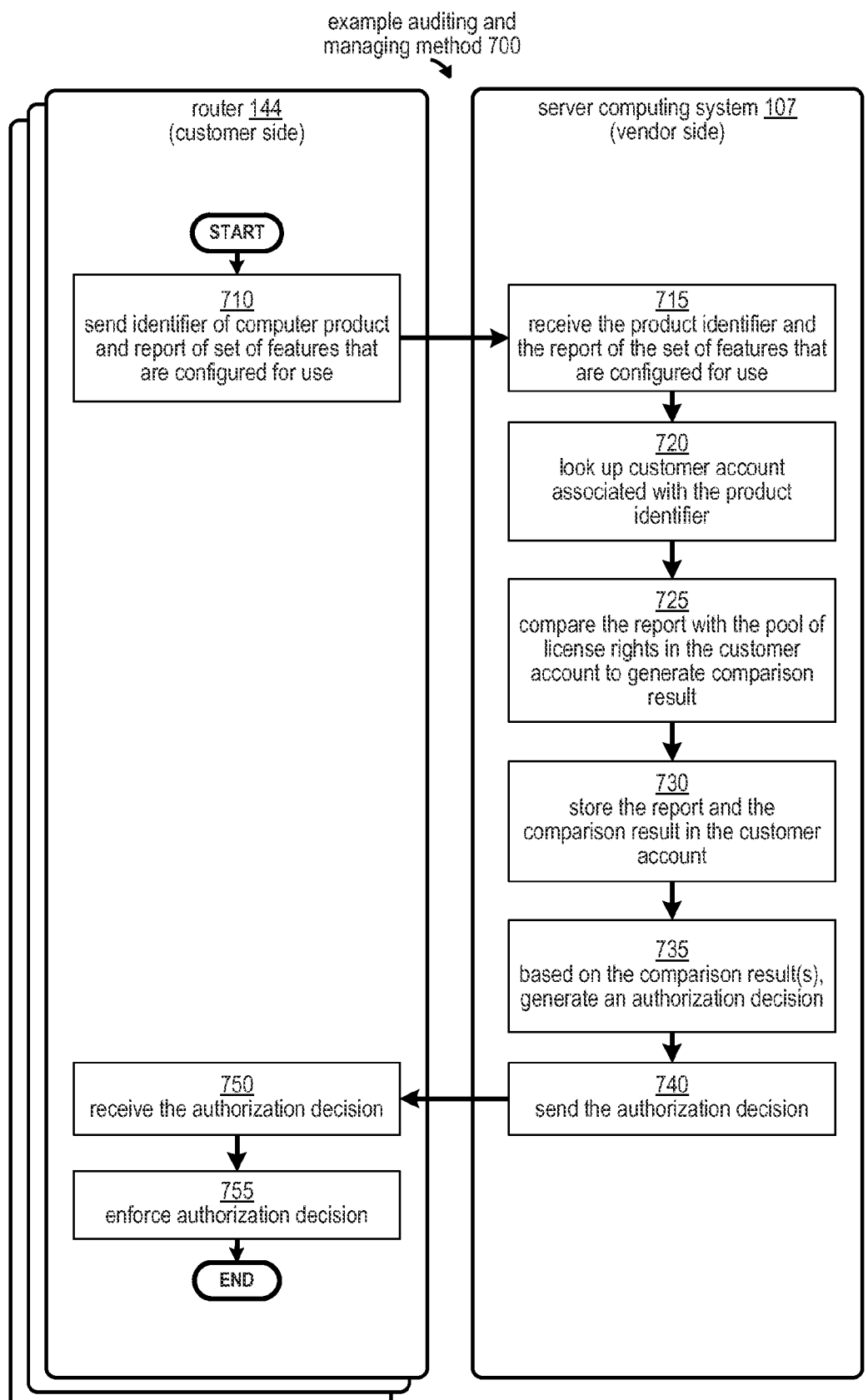
FIG. 7 illustrates an example auditing and managing method for the license manager device to audit and manage license rights for the license enforcer module, according to one embodiment.

FIG. 7 illustrates a method 700 for auditing license rights, according to one embodiment. At step 710, the router 144 sends, to the server computing system 107, a product identifier and a report of a set of features that are configured for use on the router 144. For example, the router 144 may be configured to have five open ports while running a particular version of router software. At step 715, the server computing system 107 receives the product identifier and the report of the set of features that are configured for use.

At step 720, the license manager device 110 identifies a customer account associated with the product identifier. Once the particular customer account is identified, the license manager device 110 compares the reported set of features configured for use with the entitlements in the pool. Note, the license manager 110 may have allocated some entitlements to other computer products. That is, at step 725, the server computing system 107 compares the report with the pool of license rights in the customer account to generate a comparison result. In a similar manner, the server computing system 107 can generate comparison results for other computer products in the license pool. At step 730, the server computing system 107 stores the report and the comparison result in the customer account. In a similar manner, the server computing system 107 can store the comparison results of other computer products in the license pool.

At step 735, based on the one or more comparison results, the server computing system 107 generates an authorization decision for the computer product. For example, the server computing system 107 aggregates the comparison results in the license pool to generate an aggregated comparison result. Based on the aggregated comparison result, the server computing system 107 can generate an authorization decision for each computer product in the license pool. In one embodiment, the authorization decisions are the same for all the computer products in the license pool. For example, the server computing system 107 may indicate all seventeen registered routers are either in compliance or out of compliance. In another embodiment, the authorization decisions are not all the same in the license pool. For example, server computing system 107 may indicate ten registered routers are in compliance with the entitlements, while indicating seven registered routers are out of compliance with the entitlements.

At step 740, the server computing system 107 sends the authorization decision to the router 144. In a similar manner, the server computing system 107 can send an authorization decision to other computer products in the license pool. At step 745, the server computing system 107 updates, as necessary the pool of license rights in the customer account. At step 750, the license enforcer module 750 on the customer side receives the authorization decision, which indicates the computer product is either in compliance or out of compliance. In some embodiments, the authorization decision may include instructions to be carried out by the license enforcer. At step 755, the license enforcer module 755 enforces the instructions of the authorization decision. For example, the license enforcer module 755 may disable use of the computer product if the authorization decision indicates the computer product is out of compliance.

These methods may include other steps and/or details that are not discussed in this methods overview. Other steps and/or details described herein may be a part of the methods, depending on the implementation. A person skilled in the art will understand that any system configured to implement the method steps, in any order, falls within the scope of the present invention.

While the forgoing is directed to embodiments of the present disclosure, other and further embodiments of the disclosure may be devised without departing from the basic scope thereof. For example, aspects of the present disclosure may be implemented in hardware, software, or a combination of hardware and software. One embodiment of the disclosure may be implemented as a program product for use with a computer system. The program(s) of the program product define functions of the embodiments (including the methods described herein) and can be contained on a variety of computer-readable storage media. Illustrative non-transitory computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

In view of the foregoing, the scope of the present disclosure is determined by the claims that follow.

What is claimed is:

1. A method, comprising:
   receiving, by a license manager, a request to upgrade a computer product associated with entitlements stored on a particular device along with the computer product, wherein the request includes an identifier for the computer product;
   registering the product identifier with a customer account;
   identifying the entitlements stored on the particular device;
   associating the entitlements with a pool of one or more entitlements associated with the customer account; and
   sending a callback module and an upgraded computer product to the particular device, wherein the callback module includes instructions for the particular device to register an installation of the upgraded computer product and authorize use of the upgraded computer product via the pool of entitlements.

2. The method of claim 1, further comprising:
   generating an entitlement authorization associated with the pool; and
   sending the entitlement authorization to the particular device.

3. The method of claim 1, wherein the entitlements are initially node-locked to the particular device via a product activation key.

4. The method of claim 1, further comprising, in response to the request, sending a token and an upgraded computer product to the particular device, wherein the token includes a cryptographic key used to associate a product identifier for the upgraded software application with the pool.

5. The method of claim 1, further comprising:
   receiving from the callback module a request to register the particular device; and
   in response to receiving the request, querying a database for the entitlements that are associated with the computer product.

6. The method of claim 1, further comprising, prior to registering the product identifier:
   determining that the pool of entitlements does not exist; and
   generating the pool of entitlements for the customer account.

7. A non-transitory computer-readable storage medium storing one or more application programs, which, when executed on a processor perform an operation, comprising:
   receiving a request to upgrade a computer product associated with entitlements stored on a particular device along with the computer product, wherein the request includes an identifier for the computer product;
   registering the product identifier with a customer account;
   identifying the entitlements stored on the particular device;
   associating the entitlements with a pool of one or more entitlements associated with the customer account; and
   sending a callback module and an upgraded computer product to the particular device, wherein the callback module includes instructions for the particular device to register an installation of the upgraded computer product and authorize use of the upgraded computer product via the pool of entitlements.

8. The non-transitory computer-readable storage medium of claim 7, wherein the operation further comprises:
   generating an entitlement authorization associated with the pool; and
   sending the entitlement authorization to the particular device.

9. The non-transitory computer-readable storage medium of claim 7, wherein the entitlements are initially node-locked to the particular device via a product activation key.

10. The non-transitory computer-readable storage medium of claim 7, wherein the operation further comprises, in response to the request, sending a token and an upgraded computer product to the particular device, wherein the token includes a cryptographic key used to associate a product identifier for the upgraded software application with the license pool.

11. The non-transitory computer-readable storage medium of claim 7, wherein the operation further comprises:
   receiving, from the callback module, a request to register the particular device; and
   in response to receiving the request, querying a database for the entitlements that are associated with the computer product.

12. The non-transitory computer-readable storage medium of claim 7, wherein the operation further comprises, prior to registering the product identifier:
   determining that the pool of entitlements does not exist; and
   generating the pool of entitlements for the customer account.

13. A system, comprising:
   a processor; and
   a memory hosting an application, which, when executed on the processor, performs an operation comprising:
      receiving, by a license manager, a request to upgrade a computer product associated with entitlements stored on a particular device along with the computer product, wherein the request includes an identifier for the computer product,
      registering the product identifier with a customer account, identifying the entitlements stored on the particular device, associating the entitlements with a pool of one or more entitlements associated with the customer account, and sending a callback module and an upgraded computer product to the particular device, wherein the callback module includes instructions for the particular device to register an installation of the upgraded computer product and authorize use of the upgraded computer product via the pool of entitlements.

14. The system of claim 13, the operation further comprising:

generating an entitlement authorization associated with the pool; and sending the entitlement authorization to the particular device.

15. The system of claim 13, the operation further comprising, in response to the request, sending a token and an upgraded computer product to the particular device, wherein the token includes a cryptographic key used to associate a product identifier for the upgraded software application with the pool.

16. The system of claim 13, the operation further comprising:

receiving from the callback module a request to register the particular device; and in response to receiving the request, querying a database for the entitlements that are associated with the computer product.

17. The system of claim 13, the operation further comprising, prior to registering the product identifier:

determining that the pool of entitlements does not exist; and generating the pool of entitlements for the customer account.

* * * * *